United States Patent
Lee

(10) Patent No.: US 9,201,189 B2
(45) Date of Patent: Dec. 1, 2015

(54) DISPLAY DEVICE

(75) Inventor: Jin Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/006,912

(22) PCT Filed: Mar. 21, 2012

(86) PCT No.: PCT/KR2012/002024
§ 371 (c)(1),
(2), (4) Date: Oct. 17, 2013

(87) PCT Pub. No.: WO2012/128554
PCT Pub. Date: Sep. 27, 2012

(65) Prior Publication Data
US 2014/0036532 A1    Feb. 6, 2014

(30) Foreign Application Priority Data
Mar. 22, 2011    (KR) .................. 10-2011-0025531

(51) Int. Cl.
*F21V 8/00* (2006.01)
*G02F 1/1335* (2006.01)

(52) U.S. Cl.
CPC ............ *G02B 6/0066* (2013.01); *G02B 6/0023* (2013.01); *G02B 6/0021* (2013.01); *G02F 1/133615* (2013.01); *G02F 2001/133614* (2013.01); *G02F 2202/28* (2013.01); *G02F 2202/36* (2013.01)

(58) Field of Classification Search
CPC .................................................... G02B 6/0066
USPC ................................................... 362/608, 617
See application file for complete search history.

(56) References Cited

U.S. PATENT DOCUMENTS

| | | | |
|---|---|---|---|
| 5,803,573 A | 9/1998 | Osawa et al. | |
| 5,959,316 A | 9/1999 | Lowery | |
| 7,819,539 B2 | 10/2010 | Kim et al. | |
| 8,164,825 B2 | 4/2012 | Narendran et al. | |
| 8,268,644 B2 | 9/2012 | Konno et al. | |
| 2009/0016079 A1* | 1/2009 | Mizutani ................. | 362/617 |
| 2009/0162617 A1 | 6/2009 | Moroishi et al. | |
| 2010/0002414 A1 | 1/2010 | Meir et al. | |
| 2010/0103648 A1 | 4/2010 | Kim et al. | |

FOREIGN PATENT DOCUMENTS

| | | |
|---|---|---|
| CN | 101542195 A | 9/2009 |
| CN | 101611500 A | 12/2009 |
| JP | 2009-200534 A | 9/2009 |

(Continued)

OTHER PUBLICATIONS

Taiwanese Office Action with translation issued Jul. 28, 2014.
(Continued)

*Primary Examiner* — Mary Ellen Bowman
(74) *Attorney, Agent, or Firm* — Birch, Stewart, Kolasch & Birch, LLP

(57) ABSTRACT

Disclosed is a display device. The display device includes a light source; a wavelength conversion member to convert a wavelength of light generated from the light source; and a light guide member to guide the light converted by the wavelength conversion member, wherein the wavelength conversion member is disposed in an insertion hole formed in the light guide member.

10 Claims, 6 Drawing Sheets

(56) References Cited

FOREIGN PATENT DOCUMENTS

| | | | |
|---|---|---|---|
| KR | 10-2008-0005187 A | 1/2008 |
| KR | 10-2009-0082497 A | 7/2009 |
| KR | 10-2010-0046698 A | 5/2010 |
| KR | 10-2010-0118115 A | 11/2010 |
| TW | 200702591 A | 1/2007 |
| TW | 201007250 A | 2/2010 |

OTHER PUBLICATIONS

Korean Notice of Allowance Dated Feb. 19, 2013 issued in Korean Priority Application 10-2011-002553.

* cited by examiner

DISPLAY DEVICE

TECHNICAL FIELD

The embodiment relates to a display device.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device, which is capable of displaying various images using the white light supplied to the light guide plate through the quantum dot bar as the blue light is emitted from the blue LED, has been extensively used.

DISCLOSURE OF INVENTION

Technical Problem

The embodiment provides a display device, which can be readily manufactured and has improved reliability.

Solution to Problem

A display device according to one embodiment includes a light source; a wavelength conversion member to convert a wavelength of light generated from the light source; and a light guide member to guide the light converted by the wavelength conversion member, wherein the wavelength conversion member is disposed in an insertion hole formed in the light guide member.

A display device according to one embodiment includes a light source; a wavelength conversion member to convert a wavelength of light generated from the light source; a light guide section to guide the light converted by the wavelength conversion member; a rear support section connected to the light guide section; and a display panel disposed on the light guide section, wherein the wavelength conversion member is sandwiched between the light guide section and the rear support section.

A display device according to one embodiment includes a light guide member formed with a first insertion hole and a second insertion hole adjacent to the first insertion hole; a display panel disposed on the light guide member; a wavelength conversion member aligned in the first insertion hole; and a light source aligned in the second insertion hole.

Advantageous Effects of Invention

According to the display device of the embodiment, the light source and the wavelength conversion member are disposed in the insertion hole of the light guide member. That is, according to the display device of the embodiment, the light source and the wavelength conversion member can be inserted into the insertion hole. Thus, the light source and the wavelength conversion member can be coupled with the light guide member without performing the bonding process.

Therefore, the light source, the wavelength conversion member and the light guide member can be coupled with each other through a simple assembling process. Thus, the display device according to the embodiment can be readily manufactured.

In addition, the light source is inserted into the insertion hole of the light guide member so that the light source can be securely fixed to the light guide member. Thus, the light source can be prevented from being separated from the light guide member. That is, the light generated from the light source is effectively incident into the wavelength conversion member, and the light converted by the wavelength conversion member can be effectively incident into the light guide member. Thus, the display device according to the embodiment may have the improved reliability.

MODE FOR THE INVENTION

Figure 1:
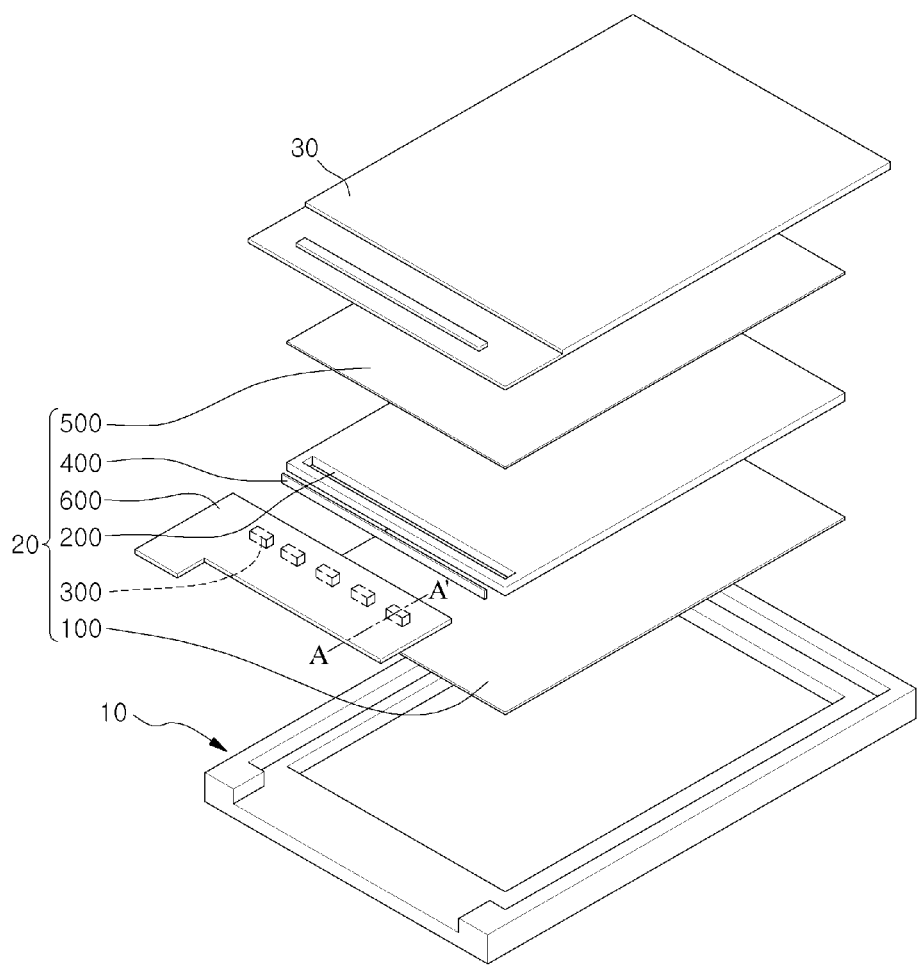
FIG. 1 is an exploded perspective view showing an LCD according to the first embodiment.

In the description of the embodiments, it will be understood that when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
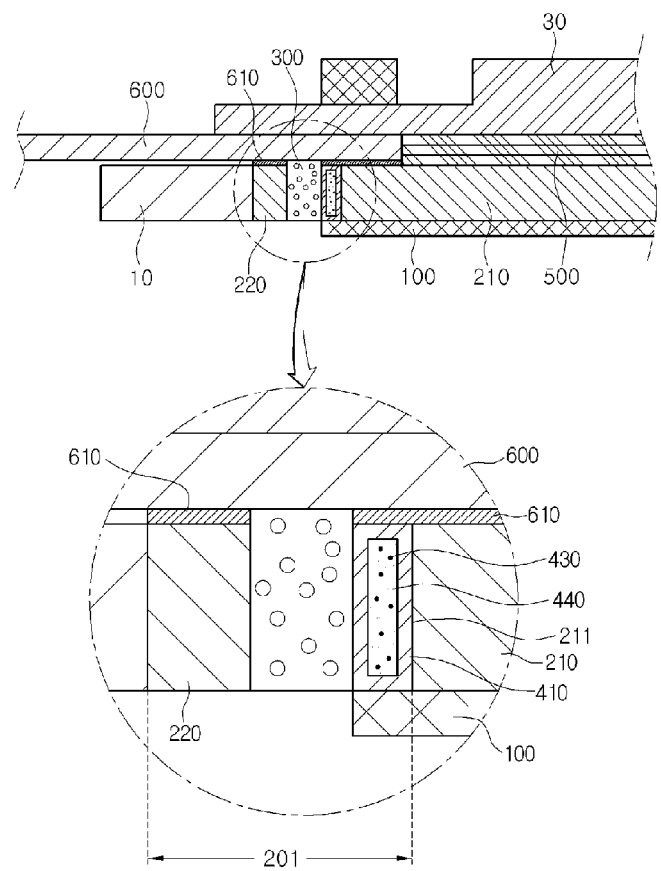
FIG. 2 is a sectional view taken along line A-A' of FIG. 1.
Figure 3:
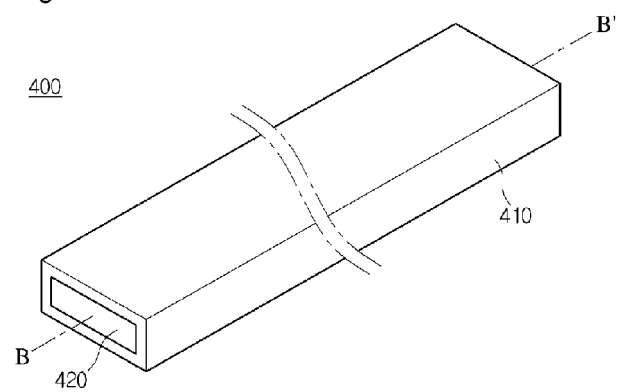
FIG. 3 is a perspective view of a wavelength conversion member according to the first embodiment.
Figure 4:
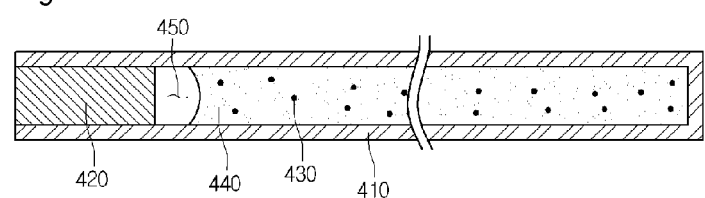
FIG. 4 is a sectional view taken along line B-B' of FIG. 3.
Figure 5:
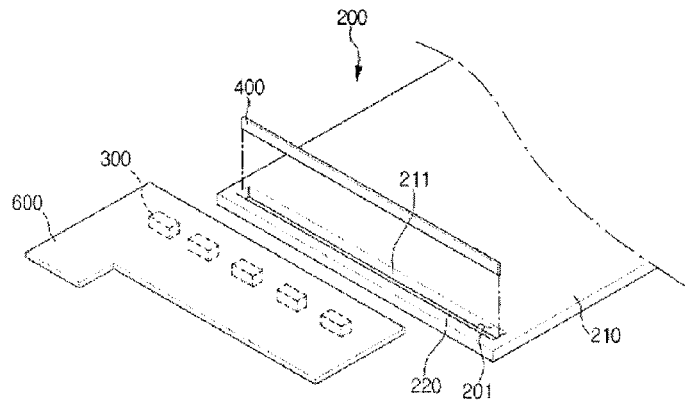
FIGS. 5 and 6 are views showing a light emitting diode and a wavelength conversion member being inserted into a light guide plate.
Figure 6:
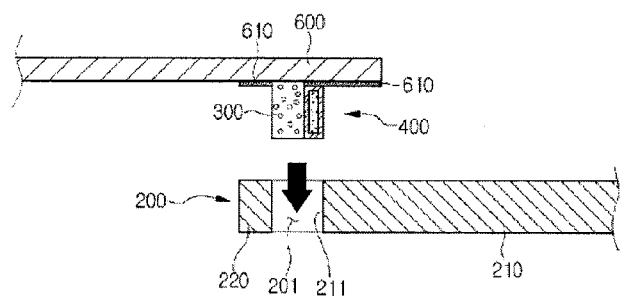

FIG. 1 is an exploded perspective view showing an LCD according to the first embodiment, FIG. 2 is a sectional view taken along line A-A' of FIG. 1, FIG. 3 is a perspective view of a wavelength conversion member according to the first embodiment, FIG. 4 is a sectional view taken along line B-B' of FIG. 3, and FIGS. 5 and 6 are views showing a light emitting diode and a wavelength conversion member being inserted into a light guide plate.

Referring to FIGS. 1 to 6, the LCD according to the embodiment includes a mold frame 10, a backlight unit 20 and a liquid crystal panel 30.

The mold frame 10 receives the backlight assembly 20 and the liquid crystal panel 30 therein. The mold frame 10 has a rectangular frame shape and may include plastic or reinforced plastic.

In addition, a chassis may be disposed below the mold frame 10. The chassis surrounds the mold frame 10 and supports the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, a light source, such as light emitting diodes 300, a wavelength conversion member 400, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100. The light guide plate 200 guides the light upward by reflecting, refracting and scattering the light incident thereto from the light emitting diodes 300. The light guide plate 200 is a light guide member for guiding the light emitted from the light emitting diodes 300.

An insertion hole 201 is formed in the light guide plate 200. The insertion hole 201 may be formed through the light guide plate 200. The light emitting diodes 300 and the wavelength conversion member 400 are inserted into the insertion hole 201. That is, the light emitting diodes 300 and the wavelength conversion member 400 are disposed in the insertion hole 201.

As shown in FIGS. 1, 2, 5 and 6, the light guide plate 200 includes a light guide section 210 and a rear support section 220.

The light guide section 210 receives the light emitted from the light emitting diodes 300 and guides the light upward by reflecting, refracting and scattering the light. The light guide section includes an incident surface 211 facing the light emitting diodes 300. That is, the incident surface 211 is one of inner surfaces of the insertion hole 201.

The rear support section 220 is connected to the light guide section 210. In detail, the rear support section 220 may be integrally formed with the light guide section 210. If the rear support section 220 is integrally formed with the light guide section 210, strength of the light guide plate 200 can be improved. In addition, the rear support section 220 can be integrally formed with the light guide section 210 by performing the injection molding process one time.

The rear support section 220 supports the light emitting diodes 300. The rear support section 220 may directly make contact with the light emitting diodes 300. The rear support section 220 may support a rear surface of the light emitting diodes 300, which is opposite to an exit surface of the light emitting diodes 300.

The light emitting diodes 300 and the wavelength conversion member 400 are sandwiched between the rear support section 220 and the light guide section 210. In detail, the rear support section 220 and the light guide section face each other while interposing the light emitting diodes 300 and the wavelength conversion member 400 therebetween. In addition, the rear support section 220 and the light guide section 210 may surround the light emitting diodes 300 and the wavelength conversion member 400.

Further, the light emitting diodes 300 and the wavelength conversion member 400 may be press-fitted into the insertion hole 201. Thus, the rear support section 220 and the light guide section 210 may apply predetermined pressure to the light emitting diodes 300 and the wavelength conversion member 400 so that the light emitting diodes 300 and the wavelength conversion member 400 can be fixed.

The light emitting diodes 300 are disposed in the insertion hole 201. In detail, the light emitting diodes 300 are inserted into the insertion hole 201.

The light emitting diodes 300 serve as a light source for generating the light. In detail, the light emitting diodes 300 emit the light toward the wavelength conversion member 400.

The light emitting diodes 300 may include a blue light emitting diode generating the blue light or a UV light emitting diode generating the UV light. In detail, the light emitting diodes 300 can emit the blue light having the wavelength band of about 430 nm to about 470 nm or the UV light having the wavelength band of about 300 nm to about 400 nm.

The light emitting diodes 300 are mounted on the FPCB 600. The light emitting diodes 300 can be disposed under the FPCB 600. The light emitting diodes 300 are driven by receiving a driving signal through the FPCB 600.

The wavelength conversion member 400 is disposed in the insertion hole 201. In detail, the wavelength conversion member 400 is disposed adjacent to the incident surface 211 of the light guide section 210. The wavelength conversion member 400 is interposed between the light emitting diodes 300 and the light guide section 210.

The wavelength conversion member 400 may directly make contact with the incident surface 211 of the light guide section 210. In addition, the wavelength conversion member 400 may directly make contact with the exit surface of the light emitting diodes 300.

The wavelength conversion member 400 receives the light from the light emitting diodes 300 to convert the wavelength of the light. For instance, the wavelength conversion member 400 can convert the blue light emitted from the light emitting diodes 300 into the green light and the red light. In detail, the wavelength conversion member 400 converts a part of the blue light into the green light having the wavelength in the range of about 520 nm to about 560 nm, and a part of the blue light into the red light having the wavelength in the range of about 630 nm to about 660 nm.

In addition, the wavelength conversion member 400 can convert the UV light emitted from the light emitting diodes 300 into the blue light, the green light and the red light. In detail, the wavelength conversion member 400 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 400 and the lights converted by the wavelength conversion member 400. In detail, the blue light, the green light and the red right are combined with each other so that the white light can be incident into the light guide plate 200.

As shown in FIGS. 2 to 4, the wavelength conversion member 400 includes a tube 410, a sealing member 420, a plurality of wavelength conversion particles 430, and a matrix 440.

The tube 410 receives the sealing member 420, the wavelength conversion particles 430 and the matrix 440 therein. That is, the tube 410 may serve as a receptacle to receive the sealing member 420, the wavelength conversion particles 430 and the matrix 440. In addition, the tube 410 extends in one direction.

The tube 410 may have a rectangular tubular shape. In detail, a section of the tube 410, which is vertical to the length direction of the tube 410, may have the rectangular shape. The tube 410 may have a width of about 0.6 mm and a height of about 0.2 mm. The tube 410 may include a capillary tube.

The tube 410 is transparent. The tube 410 may include glass. In detail, the tube 410 may include a glass capillary tube.

The sealing member 420 is disposed in the tube 410. The sealing member 420 is arranged at an end of the tube 410 to seal the tube 410. The sealing member 420 may include epoxy resin.

The wavelength conversion particles 430 are provided in the tube 410. In detail, the wavelength conversion particles 430 are uniformly distributed in the matrix 440 installed in the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 can convert the blue light emitted from the light emitting diodes 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent. The quantum dots can be synthesized through the chemical wet scheme.

The matrix 440 surrounds the wavelength conversion particles 430. In detail, the wavelength conversion particles 430 are uniformly distributed in the matrix 440. The matrix 440 includes polymer. The matrix 440 is transparent. That is, the matrix 440 includes transparent polymer.

The matrix 440 is disposed in the tube 410. In detail, the matrix 440 is fully filled in the tube 410. The matrix 440 may adhere to an inner surface of the tube 410.

An air layer 450 is formed between the sealing member 420 and the matrix 440. The air layer 450 is filled with nitrogen. The air layer 450 performs the damping function between the sealing member 420 and the matrix 440.

The wavelength conversion member 400 can be prepared through the following method.

First, the wavelength conversion particles 430 are uniformly distributed in a resin composition. The resin composition is transparent. The resin composition may have photocurable property.

Then, internal pressure of the tube 410 formed with a scattering pattern 411 is reduced, an inlet of the tube 410 is immersed in the resin composition in which the wavelength conversion particles 430 are distributed, and ambient pressure is increased. Thus, the resin composition having the wavelength conversion particles 430 is introduced into the tube 410.

Then, a part of the resin composition introduced into the tube 410 is removed and the inlet of the tube 410 becomes empty.

After that, the resin composition introduced into the tube 410 is cured by UV light so that the matrix 440 can be formed.

Then, epoxy resin composition is introduced into the inlet of the tube 410. The introduced epoxy resin composition is cured so that the sealing member 420 is formed. The process for forming the sealing member 420 is performed under the nitrogen atmosphere, so the air layer 450 including nitrogen is formed between the sealing member 420 and the matrix 440.

The optical sheets 500 are disposed on the light guide plate 200 to improve the characteristic of the light passing through the optical sheets 500.

The FPCB 600 is electrically connected to the light emitting diodes 300. The FPCB 600 can mount the light emitting diodes 300 thereon. The FPCB 600 is installed in the mold frame 10 and arranged on the light guide plate 200.

The FPCB 600 can be bonded to the light guide plate 200. That is, a dual-side tape 610 is interposed between the FPCB 600 and the light guide plate 200 to bond the FPCB 600 to the light guide plate 200.

The mold frame 10 and the backlight assembly 20 constitute the backlight unit. That is, the backlight unit includes the mold frame 10 and the backlight assembly 20.

The liquid crystal panel 30 is installed in the mold frame 10 and arranged on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As shown in FIGS. 5 and 6, the light emitting diodes 300 and the wavelength conversion member 400 are inserted into the insertion hole 201. In addition, the FPCB 600 is attached to a top surface of the light guide plate 200.

The light emitting diodes 300 and the wavelength conversion member 400 are press-fitted into the insertion hole 201. That is, after a gap between the rear support section 220 and the light guide section 210 has been slightly widened, the light emitting diodes 300 and the wavelength conversion member 400 are inserted into the gap and then the gap between the rear support section 220 and the light guide section 210 is narrowed again.

Therefore, the rear support section 220 and the light guide section are can securely fix the light emitting diodes 300 and the wavelength conversion member 400.

In addition, according to the LCD of the embodiment, the light emitting diodes 300 and the wavelength conversion member 400 can be fixed to the light guide plate 200 without performing the additional bonding process. Thus, the LCD according to the embodiment can be readily manufactured.

Further, since the light emitting diodes 300 are inserted into the insertion hole 201 and securely fixed to the light guide plate 200, the light emitting diodes 300 can be prevented from being separated from the light guide plate 200. Thus, the light emitted from the light emitting diodes 300 can be effectively incident into the wavelength conversion member 400 and the light converted by the wavelength conversion member 400 can be effectively incident into the light guide plate 200. In addition, the direction of the light emitted from the light emitting diodes 300 may not deviate from the light guide plate 200.

Therefore, the LCD according to the embodiment may have the improved reliability.

Figure 7:
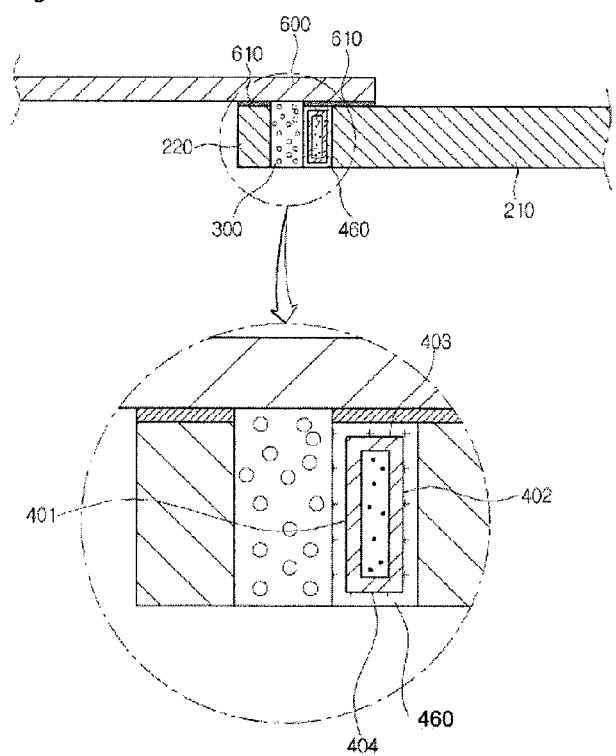
FIG. 7 is a sectional view showing an LCD according to the second embodiment.
Figure 8:
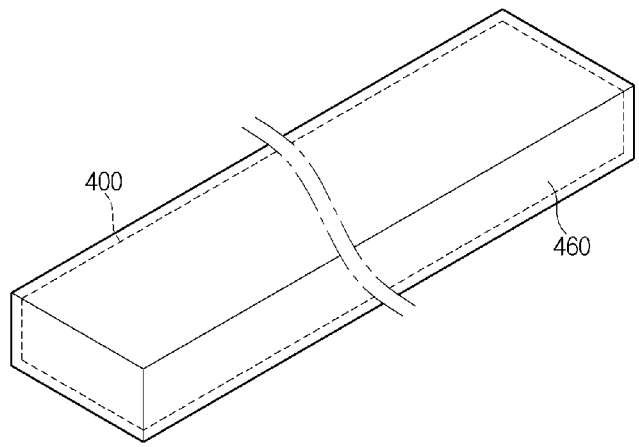
FIG. 8 is a perspective view of a wavelength conversion member according to the second embodiment.
Figure 9:
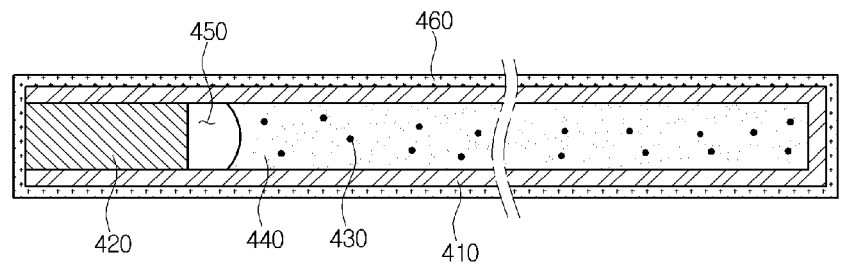
FIG. 9 is a sectional view taken along line C-C' of FIG. 7.

FIG. 7 is a sectional view showing an LCD according to the second embodiment, FIG. 8 is a perspective view of a wavelength conversion member according to the second embodiment, and FIG. 9 is a sectional view taken along line C-C' of FIG. 7. In the following description, an adhering member will be additionally described. In addition, the description about the previous embodiment will be basically incorporated herein by reference.

Referring to FIGS. 6 and 7, the adhering member 460 is disposed at an outer surface of the wavelength conversion member 400. The adhering member 460 is uniformly coated on the entire outer surface of the wavelength conversion member 400. That is, the adhering member 460 surrounds the wavelength conversion member 400.

The wavelength conversion member 400 includes a first surface 401, a second surface 402, a top surface 403 and a bottom surface 404.

The first surface 401 faces the light emitting diodes 300, and the second surface 402 faces the light guide plate. In addition, the top surface 403 extends from an outer peripheral portion of the first surface 401 to an outer peripheral portion of the second surface 402, and the bottom surface 404 faces the top surface 403. The adhering member 460 is disposed on the first surface 401, the second surface 402, the top surface 403 and the bottom surface 404.

The adhering member 460 can be disposed on the top surface 403 and the bottom surface 404 of the wavelength conversion member 400. That is, the adhering member 460 can be disposed between the wavelength conversion member 400 and the FPCB 600. In addition, the adhering member 460 can be disposed between the wavelength conversion member 400 and the light guide section 210. Further, the adhering member 460 can be disposed between the wavelength conversion member 400 and the light emitting diodes 300.

The adhering member 460 is transparent. The adhering member 460 may adhere to the outer surface of the wavelength conversion member 400. In addition, the adhering member 460 may adhere to the light emitting diodes 300 and the light guide plate 200. In detail, the adhering member 460 may adhere to the exit surface of the light emitting diodes 300 and the incident surface 211 of the light guide plate 200.

Therefore, the air layer is not formed between the light emitting diodes 300 and the wavelength conversion member 400 due to the adhering member 460. In addition, the air layer is not formed between the wavelength conversion member 400 and the light guide plate 200 due to the adhering member 460.

The adhering member 460 performs the optical damping function between the wavelength conversion member 400 and the light guide plate 200. That is, the adhering member 460 prevents the air layer from being formed between the wavelength conversion member 400 and the exit surface of the light emitting diodes 300 and between the wavelength conversion member 400 and the incident surface 211 of the light guide section 210. In addition, the adhering member 460 may have the refractive index similar to that of the tube of the wavelength conversion member 400, the filler of the light emitting diodes 300 and the light guide plate 200. Thus, the adhering member 460 may diminish the variation of the refractive index between the wavelength conversion member 400 and the exit surface of the light emitting diodes 300 and between the wavelength conversion member 400 and the light guide plate 200.

Due to the adhering member 460, the light emitted from the light emitting diodes 300 and the light converted by the wavelength conversion member 400 can be effectively incident into the light guide plate 200.

Thus, the LCD according to the embodiment may have the improved brightness.

In addition, the adhering member 460 has elasticity. Since the adhering member 460 has the elasticity, the adhering member 460 may perform the mechanical damping function between the wavelength conversion member 400 and the light guide plate 200 and between the wavelength conversion member 400 and the light emitting diodes 300.

Especially, after the adhering member 460 has been coated on the outer surface of the wavelength conversion member 400, the light emitting diodes 300 and the wavelength conversion member 400 are press-fitted into the insertion hole 201 of the light guide plate 200. At this time, since the adhering member 460 has the elasticity, the wavelength conversion member 400 can be effectively protected by the adhering member 460 when the wavelength conversion member 400 is inserted into the insertion hole 201.

In particular, if the tube of the wavelength conversion member 400 is made from glass, the adhering member 460 can prevent the tube from being broken.

Thus, the LCD according to the embodiment can be readily assembled and may have the improved mechanical strength.

Figure 10:
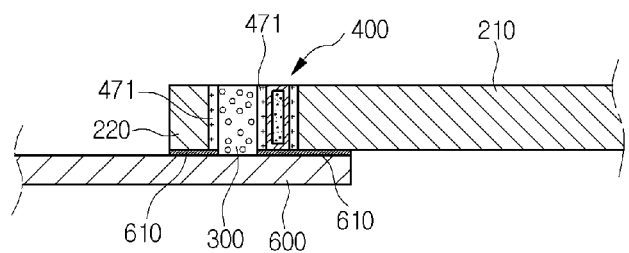
FIGS. 10 and 11 are sectional views showing the manufacturing process for an LCD according to the third embodiment.
Figure 11:
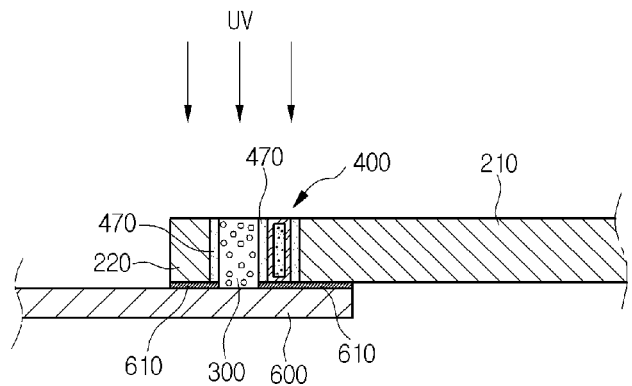

FIGS. 10 and 11 are sectional views showing the manufacturing process for an LCD according to the third embodiment. In the following description, a filling member will be additionally described. In addition, the description about the previous embodiments will be basically incorporated herein by reference.

Referring to FIG. 10, the light emitting diodes 300 and the wavelength conversion member 400 are inserted into the insertion hole 201 of the light guide plate 200. At this time, a predetermined space may remain between the light emitting diodes 300 and the wavelength conversion member 400 and between the wavelength conversion member 400 and the light guide section 210. That is, the light emitting diodes 300 and the wavelength conversion member 400 may not be press-fitted into the insertion hole 201.

Then, curable resin, that is, a photo curable resin composition and/or a thermosetting resin composition 471 is injected into the space between the wavelength conversion member 400 and the light guide section 210. The resin composition 471 may include epoxy resin.

Referring to FIG. 11, UV light and/or heat is applied to the resin composition 471 injected into the insertion hole 201, so the resin composition 471 is cured, thereby forming the filling member 470 in the insertion hole 201.

The filling member 470 performs the optical function substantially identical to that of the adhering member 460.

According to the LCD of the present embodiment, the mechanical damage of the wavelength conversion member 400 can be reduced, the brightness can be improved and the mechanical characteristic can be enhanced.

Figure 12:
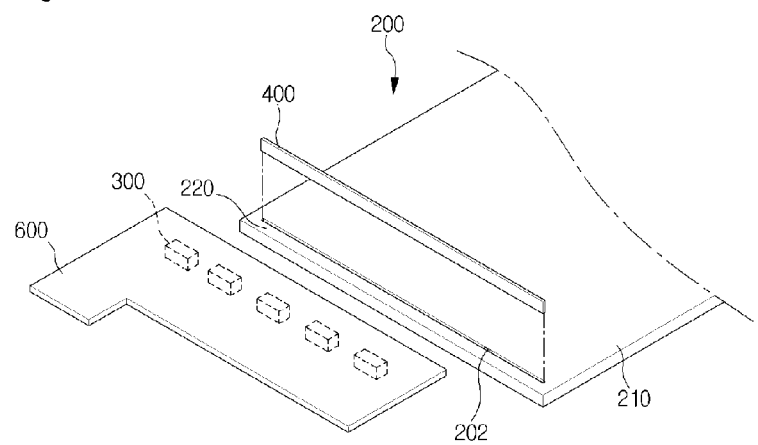
FIG. 12 is a perspective view showing a light source, a light guide plate and a wavelength conversion member according to the fourth embodiment.
Figure 13:
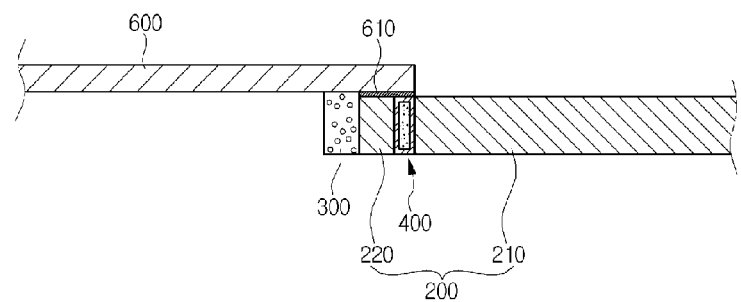
FIG. 13 is a sectional view showing a light source, a light guide plate and a wavelength conversion member according to the fourth embodiment.

FIG. 12 is a perspective view showing a light source, a light guide plate and a wavelength conversion member according to the fourth embodiment, and FIG. 13 is a sectional view showing the light source, the light guide plate and the wavelength conversion member according to the fourth embodiment. The description about the previous embodiments will be basically incorporated herein by reference.

Referring to FIGS. 12 and 13, the wavelength conversion member 400 is inserted into an insertion hole 202 formed in the light guide plate 200. At this time, the light emitting diodes 300 are disposed at the lateral side of the light guide plate 200. That is, the light emitting diodes 300 are disposed at the lateral side of the rear support section 220.

In detail, the rear support section 220 is sandwiched between the wavelength conversion member 400 and the light emitting diodes 300.

The insertion hole 202 may have a width corresponding to a thickness of the wavelength conversion member 400. In detail, the width of the insertion hole 202 is substantially equal to the thickness of the wavelength conversion member 400.

The light emitted from the light emitting diodes 300 is incident into the wavelength conversion member 400 through the rear support section 220. In detail, the light emitted from the light emitting diodes 300 is incident into the wavelength conversion member 400 after the light has been diffused through the rear support section 220.

Thus, the light emitted from the light emitting diodes 300 may not be concentrated on a local part of the wavelength conversion member 400. Since the light is not concentrated on the local part of the wavelength conversion member 400, the local degradation of the wavelength conversion particles included in the wavelength conversion member 400 can be prevented.

In addition, the light emitting diodes 300 is spaced apart from the wavelength conversion member 400 by the rear support section 220. Thus, the degradation of the wavelength conversion particles caused by heat generated from the light emitting diodes 300 can be prevented.

Further, since the light emitting diodes 300 is assembled with the light guide plate 200 separately from the wavelength conversion member 400, the LCD according to the embodiment can be readily manufactured.

Figure 14:
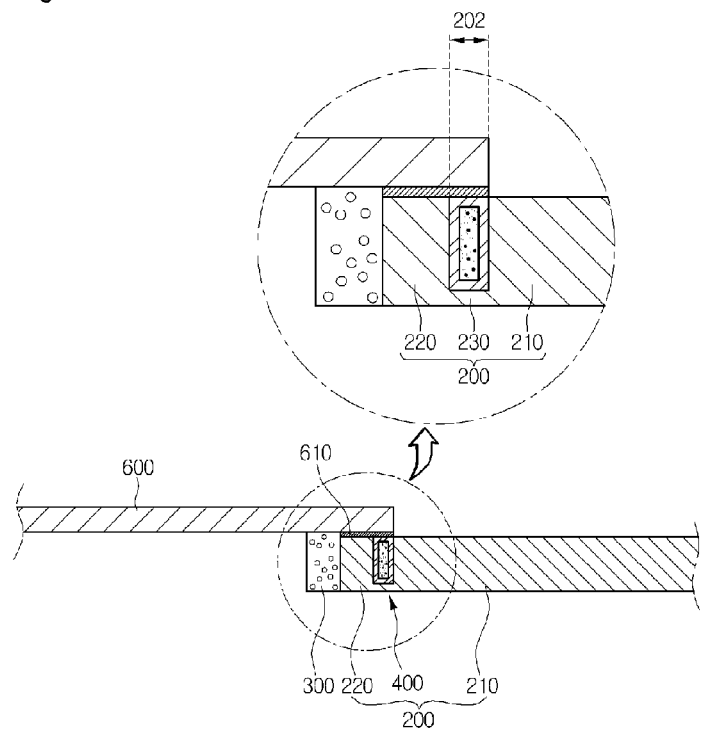
FIG. 14 is a sectional view showing a light source, a light guide plate and a wavelength conversion member according to the fifth embodiment.
Figure 15:
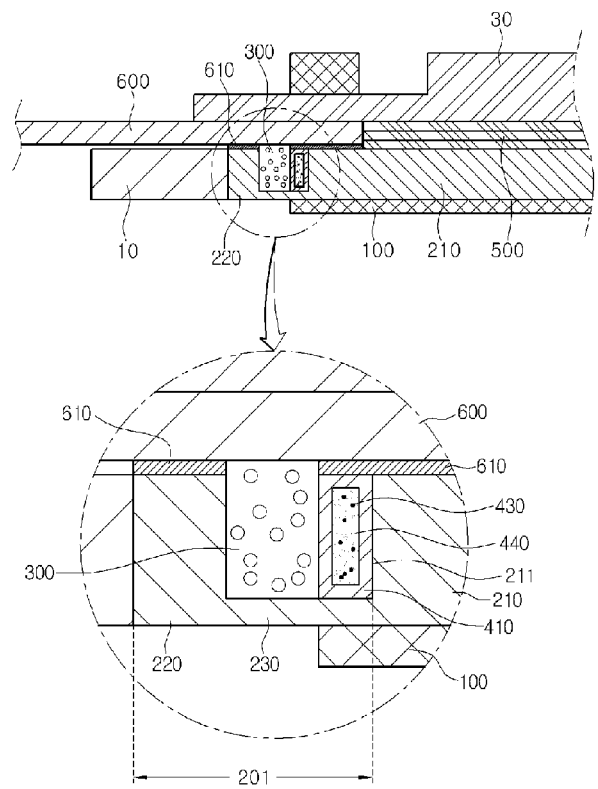
FIG. 15 is a sectional view of an LCD according to the sixth embodiment.

FIG. 14 is a sectional view showing a light source, a light guide plate and a wavelength conversion member according to the fifth embodiment, and FIG. 15 is a sectional view of an LCD according to the sixth embodiment. The description about the previous embodiments will be basically incorporated herein by reference.

Referring to FIG. 14, the light guide plate 200 includes the light guide section 210, the rear support section 220 and a lower support section 230. The lower support section 230 is disposed under the wavelength conversion member 400. That is, the lower support section 230 constitutes the bottom of the insertion hole 202 formed in the light guide plate 200.

The lower support section 230 may support the lower portion of the wavelength conversion member 400. The lower support section 230 may directly make contact with the lower portion of the wavelength conversion member 400. The lower support section 230 extends from the light guide section 210 to the rear support section 220. The lower support section 230, the light guide section 210 and the rear support section 220 may be integrally formed. In addition, the light guide section 210, the rear support section 220 and the lower support section 230 may surround the wavelength conversion member 400.

Further, referring to FIG. 15, the lower support section 230 may support the lower portion of the light emitting diodes 300. In detail, the light emitting diodes 300 and the wavelength conversion member 400 are simultaneously inserted into the insertion hole 201. At this time, the lower support section 230 may simultaneously support the lower portions of the light emitting diodes 300 and the wavelength conversion member 400. That is, the lower support section 230, the light guide section 210 and the rear support section 220 may simultaneously surround the light emitting diodes 300 and the wavelength conversion member 400.

Due to the lower support section 230, the wavelength conversion member 400 can be readily fixed in the insertion hole 202. That is, since the lower support section 230 supports the wavelength conversion member 400, the wavelength conversion member 400 can be precisely aligned in the insertion hole 202. In addition, the light emitting diodes 300 can be precisely fixed in the insertion hole 202 due to the lower support section 230.

Figure 16:
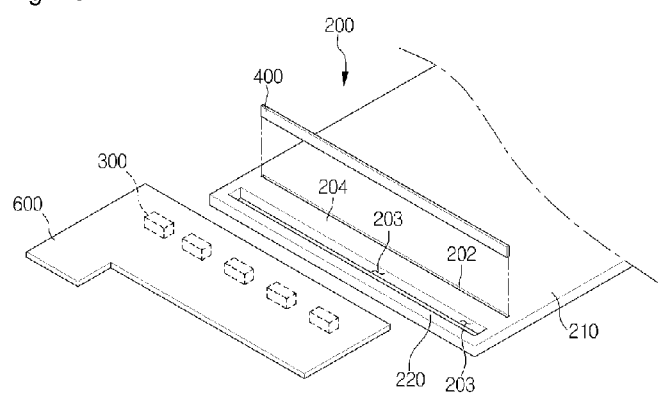
FIG. 16 is a perspective view showing a light source, a light guide plate and a wavelength conversion member according to the seventh embodiment.
Figure 17:
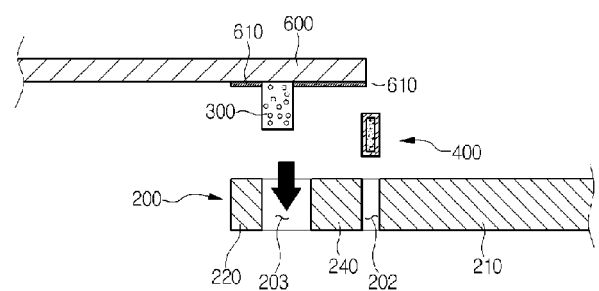
FIG. 17 is a sectional view showing a light source, a light guide plate and a wavelength conversion member according to the seventh embodiment.

FIG. 16 is a perspective view showing a light source, a light guide plate and a wavelength conversion member according to the seventh embodiment, and FIG. 17 is a sectional view showing a light source, a light guide plate and a wavelength conversion member according to the seventh embodiment. The description about the previous embodiments will be basically incorporated herein by reference.

Referring to FIGS. 16 and 17, the light guide plate 200 includes a first insertion hole 202 and a second insertion hole 203. The wavelength conversion member 400 is aligned in the first insertion hole 202 and the light emitting diodes 300 are aligned in the second insertion hole 203.

The first and second insertion holes 202 and 203 may extend in one direction in parallel to each other. In addition, the first and second insertion holes 202 and 203 may be parallel to each other.

The light guide plate 200 includes a spacer 240. The spacer 240 is disposed between the light guide section and the rear support section 220. In addition, the spacer 240 is aligned between the first and second insertion holes 202 and 203. Thus, the spacer 240 is disposed between the light emitting diodes 300 and the wavelength conversion member 400. That is, the light emitting diodes 300 are spaced apart from the wavelength conversion member 400 by the spacer 240.

Therefore, the spacer 240 can prevent the degradation of the wavelength conversion particles included in the wavelength conversion member 400. If the light emitting diodes 300 are adjacent to the wavelength conversion member 400, the wavelength conversion particles included in the wavelength conversion member 400 may be degraded due to heat generated from the light emitting diodes 300. According to the embodiment, the light emitting diodes 300 are spaced apart from the wavelength conversion member 400 by the spacer 240, so the degradation of the wavelength conversion particles included in the wavelength conversion member 400 can be prevented.

Therefore, the LCD according to the embodiment may have the improved reliability and the durability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The display device according to the embodiments can be used in the display field.

The invention claimed is:
1. A display device comprising:
a light source;
a wavelength conversion member to convert a wavelength of light generated from the light source;
a light guide member to guide the light converted by the wavelength conversion member; and
an adhering member surrounding the wavelength conversion member,
wherein the light guide plate includes a light guide section into which the light converted by the wavelength conversion member is incident, and a rear support section connected to the light guide section, wherein the wavelength conversion member is disposed in an insertion hole formed in the light guide member, and
wherein the light source is disposed at a lateral side of the rear support section opposite the light guide.

2. The display device of claim 1, further comprising a circuit board connected to the light source, wherein the circuit board is attached to the light guide member.

3. The display device of claim 1, wherein the adhering member has elasticity.

4. The display device of claim 1, wherein the wavelength conversion member comprises:
   a first surface facing the light source;
   a second surface facing the light guide plate;
   a top surface extending from the first surface to the second surface; and
   a bottom surface facing the top surface,
   wherein the adhering member is disposed on the first surface, the second surface, the top surface and the bottom surface.

5. The display device of claim 1, further comprising a filling member injected into the insertion hole.

6. The display device of claim 5, wherein the filling member includes a photo curable resin.

7. The display device of claim 1, wherein the light guide section is integrally formed with the rear support section.

8. The display device of claim 1, wherein the light guide member includes a lower support section extending from the light guide section to the rear support section.

9. The display device of claim 1, wherein the insertion hole is formed through the light guide member.

10. The display device of claim 1, wherein the adhering member has a refractive index between a refractive index of the light guide member and a refractive index of the wavelength conversion member.

* * * * *